United States Patent [19]
Herda et al.

[11] Patent Number: 5,648,311
[45] Date of Patent: Jul. 15, 1997

[54] CATALYST FOR HYDROREFINING

[75] Inventors: Wilfried R. Herda, Düsseldorf; Jürgen Koppe, Schkopau, both of Germany

[73] Assignee: Krupp VDM GmbH, Werdohl, Germany

[21] Appl. No.: 307,861

[22] Filed: Aug. 14, 1994

[30] Foreign Application Priority Data

Sep. 24, 1993 [DE] Germany .................. 43 32 473.8

[51] Int. Cl.$^6$ ................................................ B01J 23/00
[52] U.S. Cl. .......................... 502/315; 208/313; 208/305
[58] Field of Search ........................... 208/212; 502/315, 502/313, 305

[56] References Cited

U.S. PATENT DOCUMENTS

| | | | |
|---|---|---|---|
| 3,177,160 | 4/1965 | De Rosset | 502/315 |
| 4,153,578 | 5/1979 | DeThomas et al. | 252/470 |
| 4,324,645 | 4/1982 | Angevine et al. | 208/50 |
| 4,348,270 | 9/1982 | Bearden, Jr. | 208/112 |
| 5,446,229 | 8/1995 | Taylor et al. | 585/648 |

FOREIGN PATENT DOCUMENTS 2814291  10/1979  Germany  .................. C01B 2/16

*Primary Examiner*—Helane Myers
*Attorney, Agent, or Firm*—Meltzer, Lippe, Goldstein et al.

[57] ABSTRACT

The invention relates to a catalytic hydrorefining of mixtures of hydrocarbons which contain hetero atoms such as nitrogen, sulphur, halogens and/or oxygen. The characterizing feature of the invention is that nickel or a nickel-molybdenum alloy containing more than 30% nickel, residue molybdenum, is thermally treated in an air atmosphere at temperatures of 400° to 1200° C. for a period of 0.25 to 10 hours, whereafter it is subjected to a hydrogen activation in the temperature range of 200° to 600° C.

6 Claims, No Drawings

CATALYST FOR HYDROREFINING

The invention relates to a catalytic hydrorefining of mixtures of hydrocarbons which contain hetero atoms such as nitrogen, sulphur, halogens and/or oxygen.

Hydrorefining is of course performed in the presence of catalysts which contain 2 to 30% Ni and 10 to 30% $MoO_3$, carriered on $Al_2O_3$ (K. Becker and H. Spindler: Dissertation (Dr. of Natural Sciences) Halle 1984, pages 171 to 184). Production problems arise more particularly in the controlled preparation of the acid $Al_2O_3$ carrier, which according to the prior art is an absolute precondition for active hydrorefining catalysts. For example, page 174 of the Dissertation by Becker and Spindler states: "With the reduction in the operating pressure, the acidity of the catalyst had to be increased to ensure the degree of hydrorefining". However, increased acidity of the catalyst may of course at the same time encourage side reactions, such as isomerization.

It is also difficult to dispose of used hydrorefining catalysts, due to their multi-layer composition.

It is an object of the invention to develop a simple catalytic hydrorefining which makes easy disposal possible and wherein no undesirable side reactions occur.

This problem is solved according to the invention by the features that the catalyst used is nickel or a nickel-molybdenum alloy containing more than 30% nickel, residue molybdenum, said alloy being thermally treated in an air atmosphere at temperatures of 400° to 1200° C. for a period of 0.25 to 10 hours. Following the thermal treatment, a hydrogen activation is performed in the temperature range of 200° to 600° C. If necessary, a treatment with a mineral acid, preferably with nitric acid, is performed at temperatures of 0° to 100° C. prior to the thermal treatment.

The nickel-molybdenum alloy can contain additions of other metals, such as iron, chromium, titanium, aluminium which themselves are not catalytically active, but have no adverse effect on the catalytic action of the nickel-molybdenum phase, in total amount of up to 33% by weight.

The catalysts can be used in the form of a sheet or in any other form having a large enough specific surface.

The catalyst according to the invention does not produce any undesirable side reactions and is resistant to the substances such as $H_2S$, $NH_3$, $H_2O$, HCl etc. released during hydrorefining.

Although after the treatment according to the invention the catalyst no longer has any acid centres, it surprisingly shows a high enough hydrorefining activity.

The invention will be explained in greater detail by the following Examples. All percentages are percentages by weight, unless otherwise stated.

EXAMPLES

Quantities of 2.0 g catalyst were introduced into a flow tube reactor. Testing was performed at a temperature of 250° C. and a pressure of 2 bar under the following loads:

5 l/h $H_2$ with in each case 5% by volume of one of the compounds mentioned below flowed over the catalyst, the following results being obtained:

| Catalyst | Compound | Reaction (%) |
|---|---|---|
| Nickel wire 1 mm in diameter, pretreated with conc. $HNO_3$ for 10 min at 25° C., calcined for 1 hour at 600° C. and then activated for 1 hour at 450° C. in the $H_2$ flow | chlorobenzene thioglycolic acid thiophene | 85% 75% 70% |
| Spongey nickel with a surface of 0.05 $m^2$/g, calcined for 1 hour at 950° C. and then activated for 1 hour at 450° C. in the $H_2$ flow | thioglycolic acid thiophene | 85% 75% |
| Nickel-molybdenum alloy containing 69% nickel, 28% molybdenum, residue iron, wire 1 mm in diameter, pretreated with conc. $HNO_3$ or 15 mins at 35° C., calcined for 1 hour at 700° C. and then activated for 1 hour at 450° C. in the $H_2$ flow | dichloro propane thioglycolic acid thiophene | 72% 65% 60% |
| 5% nickel and 10% $MoO_3$ on $Al_2O_3$ (prior art) | chlorobenzene thioglycolic acid | 15% decomposition |
| 0.5% Pt on $Al_2O_3$ (prior art) | chlorobenzene | 35% |

In contrast with the catalysts according to the invention, the conventional catalysts show a sometimes heavy decrease in reaction, more particularly in the hydro dehalogenating reactions. Furthermore, such compounds as thioglycolic acid are completely decomposed, and this leads to undesirable deposits on the catalyst.

The activity of the catalysts according to the invention depends heavily on the specific surface, as a comparison of the reactions of the wires with the spongey bodies shows.

We claim:

1. A process for making a catalyst for hydrorefining a mixture of hydrocarbons containing heteroatoms, comprising thermally treating a solid material consisting essentially of nickel or a nickel-molybdenum alloy containing more than 30% nickel, the balance being molybdenum, in an air atmosphere at a temperature in the range of 400° to 1200° C. for a period of 0.25 to 10 hours, and thereafter subjecting said thermally treated material to hydrogen activation at a temperature in the range of 200° to 600° C. thereby to produce said hydrorefining catalyst.

2. The process of claim 1 further comprising treating said solid material with a mineral acid at a temperature in the range of 0° to 100° C. prior to said thermal treatment step.

3. The process of claim 2 wherein said mineral acid is nitric acid.

4. A process for making a catalyst for hydrorefining a mixture of hydrocarbons containing heteroatoms, comprising thermally treating a solid material consisting essentially of nickel, or a nickel-molybdenum alloy containing more than 30% nickel and at least one element selected from the group consisting of iron, chromium, titanium, and aluminum in a total amount of up to 33% by weight, the balance being molybdenum, in an air atmosphere at a temperature in the range of 400° to 1200° C. for a period of 0.25 to 10 hours, and thereafter subjecting said material to hydrogen activation at a temperature in the range of 200° to 600° C. thereby to produce said hydrorefining catalyst.

5. The process of claim 4 further comprising treating said solid material with a mineral acid at a temperature in the range of 0° to 100° C. prior to said thermal treatment step.

6. The process of claim 5 wherein said mineral acid is nitric acid.

* * * * *